United States Patent
Rex

[11] Patent Number: 5,498,782
[45] Date of Patent: Mar. 12, 1996

[54] DISTORTION CONTROL ADDITIVES FOR ULTRAVIOLET-CURABLE COMPOSITIONS

[75] Inventor: Gary C. Rex, Cross Lanes, W. Va.

[73] Assignee: Union Carbide Chemicals & Plastics Technology Corporation, Danbury, Conn.

[21] Appl. No.: 118,014

[22] Filed: Sep. 8, 1993

[51] Int. Cl.$^6$ ............................. C08F 8/30; C08L 75/04; C08L 75/06

[52] U.S. Cl. ............................. 525/126; 522/90; 522/96; 522/103; 522/107; 525/123; 525/440; 525/455; 525/457; 525/458; 525/528; 528/75

[58] Field of Search ............................. 522/96, 90, 107, 522/103; 525/126, 440, 455, 457, 458, 528, 123; 528/75

[56] References Cited

U.S. PATENT DOCUMENTS

| | | | |
|---|---|---|---|
| 3,621,093 | 11/1971 | Svoboda et al. | 264/331 |
| 3,719,521 | 3/1973 | Johnson et al. | 525/126 |
| 3,829,531 | 8/1974 | Graff | 525/126 |
| 4,035,439 | 7/1977 | Stevenson | 525/454 |
| 4,098,733 | 7/1978 | Olstowski et al. | 525/126 |
| 4,125,487 | 11/1978 | Olstowski et al. | 525/126 |
| 4,180,474 | 12/1979 | Schuster et al. | 430/288 |
| 4,223,099 | 9/1980 | von Harpe et al. | 525/126 |
| 4,382,135 | 5/1983 | Sinka et al. | 526/301 |
| 4,421,894 | 12/1983 | O'Connor et al. | 525/28 |
| 4,575,330 | 3/1986 | Hull | 425/174.4 |
| 4,634,602 | 1/1987 | Sirkoch et al. | 427/44 |
| 4,844,144 | 7/1989 | Murphy et al. | 164/35 |
| 4,876,384 | 10/1989 | Higbie et al. | 560/224 |
| 4,942,001 | 7/1990 | Murphy et al. | 264/22 |
| 5,202,366 | 4/1993 | Reid et al. | 525/126 |
| 5,373,033 | 12/1994 | Toh et al. | 522/96 |
| 5,418,112 | 5/1995 | Mirle et al. | 430/269 |

FOREIGN PATENT DOCUMENTS

| | | |
|---|---|---|
| 1564542 | 4/1980 | United Kingdom . |
| 8908021 | 9/1989 | WIPO . |
| 9010661 | 9/1990 | WIPO . |
| 9010662 | 9/1990 | WIPO . |

OTHER PUBLICATIONS

Investigation of Saturated Resins in UV Coatings; by John R. Costanza and Edward J. Kuzma—Journal of Radiation Curing pp. 24–31, Jan. 1983.

*Primary Examiner*—James J. Seidleck
*Assistant Examiner*—Rabon Sergent
*Attorney, Agent, or Firm*—W. K. Volles

[57] ABSTRACT

Distortion control additives are disclosed which comprise a polyisocyanate, a polyol or polyol blend having a hydroxyl functionality of 2 to 3 hydroxyl groups per molecule and an average molecular weight of at least about 500 grams per gram mole, a diol chain extender having from about 2 to 35 carbon atoms per molecule and an acrylate or methacrylate having an acrylate functionality of from 1 to 5 acrylate groups per molecule. Ultraviolet-curable liquid compositions comprising an unsaturated polymeric resin, a monomer and the distortion control additives of the present invention are also disclosed. The distortion control additives can provide substantial reductions in distortion, e.g., shrinkage, of objects produced by ultraviolet curing, e.g., stereolithography.

15 Claims, No Drawings

5,498,782

DISTORTION CONTROL ADDITIVES FOR ULTRAVIOLET-CURABLE COMPOSITIONS

FIELD OF THE INVENTION

The present invention relates to ultraviolet-curable liquid compositions, such as, for example, those used in stereolithograpic curing processes, and more particularly, to distortion control additives for use in such ultraviolet-curable liquid compositions.

BACKGROUND OF THE INVENTION

Stereolithography is a technology whereby three-dimensional objects, e.g. models, can be formed using computer guided ultraviolet light, such as that from a laser beam, to solidify superposed layers of a liquid ultraviolet-curable composition. Typically, a support is positioned beneath the surface of a reservoir containing the ultraviolet-curable composition. As each successive cross-sectional layer of the object being polymerized is formed, the liquid level is raised or the support is lowered and another layer is formed until the entire three-dimensional object is formed within the liquid reservoir. The geometry and dimensions of each cross-sectional layer are determined by a computer model which controls the positioning of the ultraviolet light.

It is not uncommon for levels of distortion, e.g., shrinkage, of objects made by stereolithography to range from about 10 to 30 percent. Typical problems which can arise from such distortion include, for example, warpage of flexible substrates, loss of adhesion, crazing of a coating, and the like. Since ultraviolet-cured objects made by stereolithography are often used as dimensionally accurate models for setting up mass production processes, the minimization of distortion is extremely important.

Additives such as acrylates and methacrylates have been proposed for use in ultraviolet-curable liquid compositions in order to reduce distortion of objects made therefrom. However, further improvements are needed. Thus, new distortion control additives for ultraviolet-curable liquid compositions are desired which can impart improved distortion control properties.

SUMMARY OF THE INVENTION

In accordance with the present invention, improved distortion control additives for ultraviolet-curable liquid compositions are provided which comprise the reaction product of a polyisocyanate, a polyol or polyol blend having a hydroxyl functionality of 2 to 3 hydroxyl groups per molecule and an average molecular weight of at least about 500 gram per gram mole, a diol chain extender having about 2 to 35 carbon atoms per molecule, and an acrylate or methacrylate having an acrylate functionality of from 1 to 5 acrylate groups per molecule.

By virtue of the present invention, distortion control additives are provided for ultraviolet-curable liquid compositions which can provide a reduction in distortion of up to about 20% or more as compared to unreacted acrylates or methacrylates.

DETAILED DESCRIPTION OF THE INVENTION

The acrylates and methacrylates suitable for use in preparing the distortion control additives of the present invention have an acrylate functionality of from 1 to 5 acrylate groups per molecule. Typically, the acrylate or methacrylate comprises from about 4 to 35 carbon atoms per molecule. Typical acrylates and methacrylates include, for example, monomethyl methacrylate, trimethylol propane trimethacrylate, trimethylol propane triacrylate, pentaerythritol trimethacrylate, pentaerythritol acrylate, 1,6-hexane diol diacrylate, 1,6-hexane diol dimethacrylate, pentaerythritol tetraacrylate, pentaerythritol tetramethacrylate, ethoxylated or propoxylated derivatives thereof and mixtures thereof. Mixtures of acrylates, methacrylates or acrylates and methacrylates can be employed in accordance with the present invention. Preferred acrylates and methacrylates include trimethylol propane triacrylate, trimethylol propane trimethacrylate and mixtures thereof. Preferably, the acrylate functionality of the acrylates or methacrylates is from about 2 to 5, more preferably from about 2 to 4 acrylate groups per molecule. Acrylates and methacrylates such as described above are commercially readily available, or alternatively can be prepared by those skilled in the art.

The average molecular weight of the acrylate or methacrylate typically ranges from about 86 to 525 and preferably from about 156 to 338 grams per gram mole. As used herein, the term "average molecular weight" means weight average molecular weight.

Typically, the concentration of the acrylates and methacrylates used in preparing the distortion control additives of the present invention is from about about 20 to 90 weight percent, preferably from about 40 to 60 weight percent and more preferably from about 45 to 55 weight percent based on the total weight of reactants used in preparing the distortion control additives, i.e., the polyisocyanate, the polyol, the chain extender and the acrylate or methacrylate.

The polyisocyanates suitable for use in preparing the distortion control additives of the present invention include any of the polyisocyanates known to those skilled in the art for the preparation of polyurethane materials. Examples of such polyisocyanates include, for example, tetramethylene diisocyanate, hexamethylene diisocyanate, 1,4-cyclohexane diisocyanate, 1,3-cyclohexane diisocyanate, xylene diisocyanate, isophorone diisocyanate, 4,4'-diphenylmethane diisocyanate, 2,4-toluene diisocyanate, 2,6-toluene diisocyanate, and straight or branched urethane polymers containing multiple isocyanate substituent groups, these polymers being synthesized from a simple polyisocyanate and at least one polyol having at least two active hydrogen atoms. Examples of the latter materials are isocyanate-containing prepolymers prepared by reaction of a toluene diisocyanate, or a methylenediphenylene diisocyanate or polymeric form thereof, with a polyalkylene oxide diol such as polypropylene oxide diol. Materials having three isocyanate groups may also be employed.

Preferred polyisocyanates include 2,4-toluene diisocyanate, 2,6-toluene diisocyanate, mixtures thereof, 4,4'diphenylmethane diisocyanate and isomers thereof, and isophorone diisocyanate (IPDI).

Polyisocyanates suitable for use in accordance with the present invention are known to those skilled in the art and are described, for example, in Frisch, K. C., "Fundamental Chemistry and Catalysis of Polyurethanes," Polyurethane Technology, Paul F. Bruins, Ed., Interscience Publishers, 1969. Such polyisocyanates are also readily commercially available, or alternatively can be prepared by those skilled in the art.

The average molecular weight of such polyisocyanates is typically from about 140 to 510 and preferably from about 170 to 260 grams per gram mole.

Typically, the concentration of the polyisocyanates used in preparing the distortion control additives of the present invention is from about about 1 to 10 weight percent, preferably from about 4 to 6 weight percent and more preferably from about 4.5 to 5.5 weight percent based on the total weight of reactants used in preparing the distortion control additives.

The polyols suitable for use in preparing the distortion control additives of the present invention include any of the polyols known to the art for the synthesis of polyurethane materials such as, for example, polyether polyols, polyester polyols (including those derived from polylactones), and hydroxyl group-containing vinyl polymers, polyester polyols being preferred. In these materials primary hydroxyl groups are preferred. Mixtures of these materials may also be employed. The average functionality of the polyol or polyol blend is in the range of 2 to 3 hydroxyl groups per molecule. Preferably, polyol blends include some triol.

Examples of polyols which are suitable for preparation of the distortion control additives of the present invention are materials such as, for example, (1) hydroxyl-containing vinyl-based polymers such as copolymers of vinyl acetate or other vinyl esters with hydroxyl containing unsaturated monomers, terpolymers of vinyl chloride and vinyl acetate (or other vinyl esters) with hydroxyl containing unsaturated monomers, and also, hydrolyzed versions of vinyl ester containing polymers; (2) polyester polyols, diols, and triols, such as those based on the condensation products or polycarboxylic acids and polyols, preferably those of dicarboxylic acids or anhydrides (preferably those having three or more carbon atoms) and diols (preferably those having two or more carbon atoms) with or without some triol; these are preferred materials, examples of which are the reaction products (a) of adipic acid and diethylene glycol, (b) of ethylene glycol and butylene glycols mixtures with adipic acid, (c) of ethylene glycol with adipic acid, (d) of butylene glycol with adipic acid, (e) of hexanediol with adipic acid, (f) of neopentyl glycol with adipic acid, (g) of propylene glycol with adipic acid, (h) of mixtures of adipic acid and isophthalic acid with such glycols as diethylene glycol or hexanediol or mixtures of hexanediol and ethylene glycol, (i) of adipic acid with mixtures of diethylene glycol and glycerine; (3) lactone polyols, particularly those obtained from the polymerization of e-caprolactone; (4) modified polyester polyol prepared by reaction of e-caprolactone, diacid, and diol; (5) polyether polyols, diols, and triols, such as polypropylene oxide and ethylene oxide capped PPO (which yields primary hydroxyls); and (6) amine-terminated polyols such as amino terminated polypropylene oxide or polypropylene oxide/polyethylene oxide polyethers.

Polyols suitable for use in accordance with the present invention are known to those skilled in the art and are described, for example, in Frisch, K. C., supra. Such polyisocyanates are also readily commercially available, or alternatively can be prepared by those skilled in the art.

The average molecular weight of such polyols is typically from about 500 to 10,000 and preferably from about 1000 to 3000 gram per gram mole.

Typically, the concentration of the polyols used in preparing the distortion control additives of the present invention is from about about 30 to 60 weight percent, preferably from about 35 to 50 weight percent and more preferably from about 40 to 46 weight percent based on the total weight of reactants used in preparing the distortion control additives.

The diol chain extenders which are suitable for use in preparing the distortion control additives of the invention are different from the polyols discussed above. The diol chain extenders have molecular weights generally in the range of 62 to 500 grams per gram mole, and generally contain between 2 and 32 carbon atoms. The diol chain extenders preferably contain from about 2 to 8, more preferably from about 2 to 4 carbon atoms per molecule.

Examples of low molecular weight diol chain extenders which may be employed in synthesizing the distortion control additives of the present invention include, for example, neopentyl glycol, 1,4-butanediol and other butanediol isomers, 1,6-hexanediol and other hexanediol isomers, ethylene glycol, 1,3-propylene glycol and 1,2-propylene glycol, isomers of cyclohexane dimethanol, 1,6-octanediol and other octanediol isomers, diethylene glycol, and dipropylene glycol. Preferred materials include aliphatic linear, primary diols. These materials are readily commercially available, or alternatively, may be readily prepared by methods well known to those skilled in the art.

The average molecular weight of such diol chain extenders is typically from about 66 to 200 and preferably from about 66 to 90 grams per gram mole.

Typically, the concentration of the diol chain extenders used in preparing the distortion control additives of the present invention is from about about 0.2 to 6.0 weight percent, preferably from about 0.5 to 4.0 weight percent and more preferably from about 1.5 to 2.0 weight percent based on the total weight of reactants used in preparing the distortion control additives.

Preferably, a sufficient quantity of diol chain extender is provided as a reactant for preparing the distortion control additives of the present invention in order to enhance the solubility of the distortion control additive in the monomer used in the ultraviolet-curable liquid composition. More preferably, the concentration of the diol chain extender is from about 0.5 to 4.0 weight percent and most preferably from about 1.5 to 2.0 weight percent based upon the total weight of the reactants used in preparing the distortion control additives.

Preferably the molar ratio of polyisocyanate e.g., toluene diisocyanate, to hydroxyl functionality is greater than 1.0, preferably from about 1.0 to 3.0, and more preferably from about 1.1 to 1.3.

A particularly preferred distortion control additive comprises the reaction product of (a) from about 5.0 to 6.0 weight percent of 2,4-toluene diisocyanate;

(b) from about 44 to 47 weight percent of a polyester polyol based on the reaction product of polycarboxylic acids or anhydrides and diols;

(c) from about 1.5 to 2.0 weight percent of 1,4-butanediol, ethylene glycol or mixtures thereof; and (d) from about 48 to 52 weight percent of trimethylol propane triacrylate, trimethylol propane trimethacrylate, or mixtures thereof.

The distortion control additives of the invention are synthesized by reacting the acrylate or methacrylate, the polyisocyanate, the polyol or blend of polyols, and the diol chain extender in the presence of a catalyst in the manner known to the art. Typical catalysts are dibutyl tin dilaurate, stannous octoate, triethylamine, and tetramethylbutanediamine. In the reaction, the sum of the moles of the polyol and diol chain extenders is preferably in a slight molar excess, e.g., greater than 10% relative to the polyisocyanate. The diol chain extender typically comprises between 20 and 80 percent of the sum of the polyol and diol chain extender on a molar basis. Preferably, the diol chain extender comprises 40 to 60 percent of the sum of polyol and diol chain extender on a molar basis. Preferably, the residues of the diol chain extender will generally comprises between 1 and 25 percent by weight, preferably 4 to 7 percent by weight, of the product polyurethane.

The preparation of polyurethanes is generally known to those skilled in the art and described, for example, in Frisch, K. C., supra. Typically, the reaction is conducted at a temperature of from about 40° to 80° C., preferably from about 55° to 60° C., and at a pressure of typically from about 0.8 to 1.2 atmospheres. The reaction time typically ranges from about 0.5 to 10 hours preferably from about 1 to 5 hours. Preferably, product samples are taken during the reaction and tested for the concentration of polyisocyanate. The reaction is preferably terminated, i.e., by discontinuing the heating or cooling, when the concentration of the polyisocyanate is less than 0.10 wt. percent. Preferably, the reaction is conducted under an inert atmosphere, such as, for example, a nitrogen atmosphere. Preferably, the Hydroxyl Number of the product is less than 8 and is preferably from 3 to 5. As used herein, the term "Hydroxyl Number" means milligrams of KOH per gram of product.

In accordance with the present invention, the synthesis produces a reaction product which comprises the distortion control additives of the present invention and portion of the acrylate or methacrylate reactant. Preferably. the reaction product comprises at least 30 weight percent, more preferably at least 50 weight percent and most preferably at least 60 weight percent of the starting acrylate or methacrylate reactant based on the total weight of the reaction product.

The ultraviolet-curable liquid compositions of the present invention comprise the above described distortion control additives in addition to an unsaturated polymeric resin and a monomer suitable for crosslinking with the unsaturated polymeric resin. Typically, the unsaturated polymeric resin has an average molecular weight of at least 500, preferably from about 500 to 2000 grams per gram mole. Typical unsaturated polymeric resins include, for example, epoxy diacrylates, polyester diacrylates, polyurethane diacrylates, acrylate capped polyurethane polyacrylates, acrylated polyacrylates, acrylated polyethers, and the like. Such unsaturated polymeric resins are commercially available, or alternatively can be prepared by those skilled in the art. U.S. Pat. No. 4,942,001 for example, provides a description of such unsaturated polymeric resins.

The monomers suitable for use in the ultraviolet-curable liquid compositions of the present invention include, for example, vinyl monomers, such as, vinyl pyrrolidone and vinyl caprolactam, acrylamides and acrylates and methacrylates. In a preferred aspect of the invention, the material which comprises the monomer is the same material which comprises the acrylate or methacrylate in the distortion control additives of the present invention.

Typically the ultraviolet-curable liquid composition comprises from about 40 to 60 weight percent of the unsaturated polymeric resin, from about 30 to 60 weight percent of the monomer and from about 5 to 60, preferably about 10 to 30 weight percent of the distortion control additive based upon the total weight of the ultraviolet-curable liquid composition.

The ultraviolet-curable liquid compositions of the present invention may also contain one or more conventional additives such as, for example: a photoinitiator, such as, for example, benzophenone, diethoxyacetylphenone, and benzoketals; fillers; mold release agents; rubbers and elastomers. The details concerning the selection and amounts of such ingredients are known to those skilled in the art.

The energy that is utilized to cure the liquid compositions is light in or near the ultraviolet range, i.e. light having a wave length of about 200 to about 550, preferably about 250 to about 450 nanometers. The term "near" as used in the phrase "near the ultraviolet range" refers to light at the lower end of the visible light spectrum. Further details concerning the methods and apparatus suitable for curing liquid compositions by ultraviolet radiation are known to those skilled in the art. Note, for example, U.S. Pat. No. 4,575,330 which discloses an apparatus for the production of three-dimensional objects by stereolithography.

Objects produced by the ultraviolet curing of polymeric compositions, and in particular by stereolithography, have a wide variety of uses. One preferred use of such objects is as models for setting up commercial mass production operations. For example, in the automotive industry, essentially every part of the automobile, e.g., a steering wheel, must be modeled in order to access its form, fit and function. Often, the models must be as dimensionally accurate as possible in order to provide meaningful results. Those skilled in the art will recognize that there are a multitude of other uses for the objects produced by ultraviolet curing in accordance with the present invention. Such uses include, for example, the manufacturing of custom prosthetic devices and aerospace components.

Quite unexpectedly, it has been found that when the distortion control additives of the present invention are prepared using acrylates or methacrylates which are multifunctional, i.e., having 2 or more acrylate groups per molecule, preferably from about 2 to 5 acrylate groups per molecule, enhanced properties can be imparted to the ultraviolet-curable liquid composition. More specifically, such distortion control additives can provide a reduced amount of distortion, e.g., shrinkage, as compared to distortion control additives which are not prepared from multifunctional acrylates or methacrylates, or alternatively distortion control additives which contain multifunctional acrylates or methacrylates but which are not reacted with the polyisocyanates, polyols and diol chain extenders of the present invention.

For example, a distortion control additive which is prepared from a polyisocyanate, a polyol, a diol chain extender and a monofunctional acrylate or methacrylate, such as monomethylacrylate typically would exhibit poorer distortion control because the crosslink density of such a system would be too low for effective phase separation of the saturated polyurethane. The more complete the phase separation of the saturated polyurethane, the better the distortion control.

In addition, a distortion control additive which is prepared from a polyisocyanate, a polyol and a multifunctional acrylate or methacrylate without a diol chain extender typically would provide an insoluble, i.e., milky, highly viscous, reaction product.

Furthermore, a distortion control additive which comprises a polyisocyanate, a polyol and a diol chain extender, but which does not have the multifunctional acrylate or methacrylate present typically would be a tacky solid. This would create a handling problem at both the manufacturing and the compounding sites. In contrast, the distortion control addtitive produced in accordance with the present invention, provides an easily pourable, pumpable liquid.

Moreover, a distortion control additive which is prepared from a polyisocyanate, a polyol, a diol chain extender and an olefinically unsaturated, non-acrylic reactant, such as, for example, styrene, vinyl toluene isomers, substituted styrenes, and the like, typically would cause the crosslinking reaction to occur at too slow a rate as to be a practical additive in a stereolithographic formulation.

Accordingly, preferably the reactants for preparing the distortion control additives of the present invention comprise less than about 5 weight, percent more preferably less than about 2 weight percent, and most preferably a substantial absence, i.e., less than about 1 weight percent, of such unsaturated, non-acrylic reactants. Such unsaturated, non-acrylic compounds may be used, however, as monomers in the ultraviolet-curable composition.

The following examples are provided for illustrative purposes and are not intended to limit the scope of the claims which follow.

The following ingredients were used in the Examples.

Tone D737—65 weight percent caprolactone, 35 weight percent diethylene glycol/adipate polyester polyol, available from Union Carbide Corporation, Danbury, Conn.

Tone 0260—100 weight percent polycaprolactone available from Union Carbide Corporation, Danbury, Conn.

Rucoflex S1011-35—Diethylene glycol/adipate polyester polyol available from Ruco Polymer Corp., Hicksville, N.Y.

DBTDL—dibutyltindilaurate available from Aldrich Chemical, Milwaukee, Wis.

TMPTA—trimethylol propane triacrylate available from Sartomer Corp., Exton, Pa.

TMPTMA—trimethylol propane trimethacrylate available from Sartomer Co., Exton, Pa.

TDI—toluene diisocyanate available from Miles, Inc. from Pittsburgh, Pa.

IRGACURE 651—a photoinitiator available from Ciba-Geigy, Hawthorne, N.Y.

SLR 800—a completely formulated stereolithographic formulation available from DeSoto Inc., Des Plaines, Ill.

SR 9020—a urethane acrylate—based unsaturated polymeric resin available from Sartomer Co., Exton, Pa.

SR 9720—a urethane acrylate based unsaturated polymeric resin available from Sartomer Co., Exton, Pa.

EXAMPLE 1

Preparation of Distortion Control Additive

Approximately 429 grams of TMPTA, 0.26 grams of p-benzoquinone, 373 grams of Tone D737, 7.4 grams of 1,4-butanediol and 5.1 grams of ethylene glycol were introduced to a flask. The flask was inserted in a heating mantel and heated to a temperature of 60° C. A nitrogen purge was then introduced over the liquid reactants. Approximately 43.5 grams of TDI were added to the reaction flask. The reaction temperature was maintained at 60° C. for about 1.5 hours. Approximately 0.17 grams of DBTDL was then added to the reaction flask and the reactants were maintained at 60° C. for an additional 1.0 hour. At this time a sample was taken and tested for the concentration of TDI and the Hydroxyl Number was measured. If the concentration of TDI was less than 0.10 weight percent then the reaction was terminated by turning off the heating mantel. Otherwise, the reaction was continued at 60° C. for an additional 2 hours or until the concentration of TDI was less than 0.10 weight percent. Hydroxyl Numbers of 2 to 10 were considered to be acceptable.

Four additional distortion control additive samples were prepared in accordance with the procedure described above with the exception that TMPTA was replaced with TMPTMA and ethylene glycol was not employed in sample number 2 and sample number 3. The synthesis of samples 4 and 5 did not incorporate any chain extender whatsoever. The specific proportions of the reactants are set forth in Table 1 below.

TABLE 1

| SAMPLE NO. | TMPTA (g) | TMPTMA (g) | p-benzo-quinone (g) | Tone D737 (g) | Tone 0260 (g) | RUCOFLEX S1011-35 (g) | 1,4 Butanediol (g) | Ethylene Glycol (g) | TDI (g) | DBTDL (g) |
|---|---|---|---|---|---|---|---|---|---|---|
| 1 | 429 | — | 0.26 | 373 | — | — | 7.4 | 5.1 | 43.5 | 0.17 |
| 2 | — | 442 | 0.09 | 383 | — | — | 14.9 | — | 43.5 | 0.18 |
| 3 | — | 475 | 0.09 | 415 | — | — | 16.1 | — | 43.5 | 0.19 |
| 4 | — | 458 | 0.09 | — | 439 | — | — | — | 19.6 | 0.18 |
| 5 | — | 463 | 0.09 | — | — | 443 | — | — | 20.0 | 0.19 |

EXAMPLE 2

Solubility of Distortion Control Additives

Synthesis of samples number 4 and 5 gave products that were highly viscous, and completely opaque. The polymers of these samples were not soluble in the multifunctional acrylate, whereas the products of samples numbers 1, 2, and 3, gave products of acceptable viscosity and were completely clear. The presence of the chain extender in the polyurethane is important in imparting solubility in the multifunctional acrylate.

EXAMPLE 3

Preparation and Testing of Ultraviolet-Curable Composition

The following ultraviolet-curable liquid compositions were prepared by mixing each of the ingredients set forth in Table 2 below in the proportions indicated:

TABLE 2

| ULTRAVIOLET-CURABLE COMPOSITIONS | | | | |
|---|---|---|---|---|
| | COMPOSITION, (g) | | | |
| COMPONENT | 6 | 7 | 8 | 9 |
| SLR-800 | 100 | 100 | | |
| SR-9020 | | | 50 | 50 |
| SR-9720 | | | 50 | 50 |
| SAMPLE 1 | 30 | | 30 | |
| TMPTA | | 15 | | 15 |
| VINYL PYRROLIDONE | | | | 15 |
| IRGACURE 651 | | | 2.5 | 2.5 |

In order to determine the degree of distortion for the above described ultraviolet-curable compositions, the following test was conducted. The UV cure apparatus consisted of a Mini Laboratory Conveyor available from American Ultraviolet, Santa Ana, Calif., which contained a mercury bulb, AUV6A/300. An aluminum mold was used which had outside dimensions of 18 inches long by 1 inch high by 2 inches wide. The cavity in the aluminum mold measured 16 inches long by 0.02 inches high by 1 inch wide. In order to measure the distortion, i.e., shrinkage, of the compositions, two scribe marks were placed approximately 4 inches from each end and were measured to be 10.020 inches apart. The conveyor belt speed was 8 feet per minute. The lamp intensity of the mercury bulb was 300 watts per inch. The mold was initially coated with an external mold release agent. Then 5 grams of the composition were syringed onto the surface of the mold. The mold was placed on the conveyor and passed under the UV lamp one time. The cured casting was immediately removed from the mold. The distance Y (mils, i.e., 1/1000th of an inch) between the scribe marks noted above was measured after a 24 hour stabilization period. The distortion control value (DCV) was calculated by substracting 10,020 mils from the distance Y and dividing the remainder by 10.020 inches, i.e.,DCV=(Y-10, 020 mils)/10.020 inch.

The DCV's for each of the compositions 6, 7, 8 and 9 are set forth in Table 3 below.

TABLE 3

DISTORTION CONTROL TEST

| COMPOSITION | DISTORTION CONTROL VALUE (DCV) (MILS/INCH) | PERCENTAGE DECREASE |
|---|---|---|
| 6 | −10.578 | 23 |
| 7 | −13.672 | — |
| 8 | −10.778 | 15 |
| 9 | −12.724 | — |

It can be seen that, quite surprisingly, the amount of shrinkage for composition 7 which comprised TMPTA, i.e., −13.672, was significantly higher than the amount of shrinkage for composition 6 which contained a distortion control additive in accordance with the present invention, i.e., −10.578. Similarly, the amount of shrinkage for composition 9, which contained TMPTA and vinyl pyrrolidone, i.e. −12.274, was substantially higher than the amount of shrinkage for composition, 8, i.e., −10.778, which contained a distortion control additive in accordance with the present invention. Thus, the data in Table 3 demonstrate a decrease in distortion of 15 percent for composition 8, as compared to composition 9 and a decrease in distortion of 23 percent of composition 6, as compared to composition 7. Accordingly, the above data demonstrate that the distortion control additives of the present invention can provide reductions in distortion, e.g., shrinkage, of up to about 20 percent or more.

Although the present invention has been described with respect to specific aspects, those skilled in the art will recognize that other aspects are intended to be included within the scope of the claims which follow.

I claim:

1. In an ultraviolet-curable liquid composition comprising;
    (i) an unsaturated polymeric resin having an average molecular weight of at least 500 grams per gram mole;
    (ii) a monomer suitable for crosslinking with the unsaturated polymeric resin; and
    (iii) a distortion control additive; the improvement wherein the distortion control additive comprises the reaction product of:
        (a) from about 1 to 10 weight percent of a polyisocyanate;
        (b) from about 30 to 60 weight percent of a polyol or polyol blend having a hydroxyl functionality of 2 to 3 hydroxyl groups per molecule and an average molecular weight of about 500 to 10,000 grams per gram mole;
        (c) from about 0.2 to 6 weight percent of a diol chain extender having between 2 and 32 carbon atoms per molecule; and
        (d) from about 20 to 90 weight percent of an acrylate or methacrylate having a acrylate functionality of from 2 to 5 acrylate groups per molecule.

2. The composition of claim 1 wherein the acrylate or methacrylate comprises from about 4 to 35 carbon atoms per molecule.

3. The composition of claim 1 comprising from about 5 to 60 weight percent of the distortion control additive.

4. The composition of claim 1 wherein the acrylate or methacrylate is selected from the group consisting of, trimethylol propane trimethacrylate, trimethylol propane triacrylate, pentaerythritol trimethacrylate, 1,6-hexanediol diacrylate, 1,6-hexane diol dimethacrylate, pentaerythritol tetraacrylate, pentaerythritol tetramethacrylate, ethoxylated and propoxylated derivatives thereof, and mixtures thereof.

5. The composition of claim 1 wherein the monomer is the same as said acrylate or methacrylate.

6. In an ultraviolet-curable liquid composition comprising;
    (i) from about 40 to 60 weight percent of an unsaturated polymeric resin having an average molecular weight of at least 500 grams per gram mole;
    (ii) from about 30 to 60 weight percent of a monomer suitable for crosslinking with the unsaturated polymeric resin; and
    (iii) from about 5 to 60 weight percent of a distortion control additive; the improvement wherein the distortion control additive comprises the reaction product of:
        (a) from about 1 to 10 weight percent of a polyisocyanate;
        (b) from about 30 to 60 weight percent of a polyol or polyol blend having a hydroxyl functionality of 2 to 3 hydroxyl groups per molecule and an average molecular weight of about 500 to 10,000 grams per gram mole;
        (c) from about 0.2 to 6 weight percent of a diol chain extender having from about 2 to 8 carbon atoms per molecule; and
        (d) from about 20 to 90 weight percent of an acrylate or methacrylate having a acrylate functionality of from 2 to 5 acrylate groups per molecule.

7. The composition of claim 6 wherein the acrylate or methacrylate is selected from the group consisting of trimethylol propane trimethacrylate, trimethylol propane triacrylate, and mixtures thereof.

8. The composition of claim 6 wherein the polyisocyanate is selected from the group consisting of 2,4-toluene diisocyanate, 2,6-toluene diisocyanate, 4,4'-diphenylmethane diisocyanate and isomers thereof, isophorone diisocyanate, and mixtures thereof.

9. The composition of claim 6 wherein the polyol has an average molecular weight of from about 1000 to 3000 grams per gram mole.

10. The composition of claim 6 wherein the diol chain extender is selected from the group consisting of neopentyl glycol, butanediol isomers, hexanediol isomers, ethylene glycol, propylene glycol isomers, isomers of cyclohexane dimethanol, octanediol isomers, diethylene glycol, and dipropylene glycol.

11. The composition of claim 6 wherein the diol chain extender is selected from the group consisting of neopentyl glycol, 1,4-butanediol, 1,6-hexanediol, ethylene glycol, 1,3-propylene glycol, 1,2-propylene glycol, 1,6-octanediol, diethylene glycol and dipropylene glycol.

12. The composition of claim 6 wherein the distortion control additive comprises less than about 5 weight percent of olefinically unsaturated non-acrylic reactants.

13. The composition of claims 6 wherein the distortion control additive comprises the reaction product of:
   (a) from about 4 to 6 weight percent of 2,4-toluene diisocyanate;
   (b) from about 35 to 50 weight percent of a polyester polyol based on the reaction product of polycarboxylic acids or anhydrides and diols;
   (c) from about 0.5 to 4.0 weight percent of 1,4-butanediol, ethylene glycol or mixtures thereof; and
   (d) from about 40 to 60 weight percent of trimethylol propane triacrylate, trimethylol propane trimethacrylate, and mixtures thereof.

14. The composition of claim 13 wherein the distortion control additive has less than about 1 weight percent of olefinically unsaturated non-acrylic reactants.

15. In an ultraviolet-curable liquid composition comprising;

(i) from about 40 to 60 weight percent of an unsaturated polymeric resin having an average molecular weight of at least 500 grams per gram mole;

(ii) a monomer suitable for crosslinking with the unsaturated polymeric resin; and (iii) from about 5 to 60 weight percent of a distortion control additive; the improvement wherein:
   (1) the distortion control additive comprises the reaction product of:
      (a) from about 4 to 6 weight percent of 2,4-toluene diisocyanate;
      (b) from about 35 to 50 weight percent of a polyester polyol based on the reaction product of polycarboxylic acids or anhydrides and diols, said polyol having an average molecular weight of about 500 to 10,000 grams per gram mole;
      (c) from about 0.5 to 4.0 weight percent of 1,4-butanediol, ethylene glycol or mixtures thereof; and
      (d) from about 40 to 60 weight percent of trimethylol propane triacrylate, trimethylol propane trimethacrylate, or mixtures thereof; and
   (2) the distortion control additive has less than about 1 weight percent of olefinically unsaturated non-acrylic reactants.

* * * * *